US007809917B2

United States Patent
Burton et al.

(10) Patent No.: US 7,809,917 B2
(45) Date of Patent: Oct. 5, 2010

(54) VIRTUAL INCREMENTAL STORAGE APPARATUS METHOD AND SYSTEM

(75) Inventors: David Alan Burton, Vail, AZ (US); Noel Simen Otterness, Lafayette, CO (US)

(73) Assignee: International Business Machines Corporation, Armonk, NY (US)

(*) Notice: Subject to any disclaimer, the term of this patent is extended or adjusted under 35 U.S.C. 154(b) by 311 days.

(21) Appl. No.: 12/123,166

(22) Filed: May 19, 2008

(65) Prior Publication Data

US 2008/0222376 A1    Sep. 11, 2008

Related U.S. Application Data

(63) Continuation of application No. 10/713,445, filed on Nov. 14, 2003, now Pat. No. 7,412,583.

(51) Int. Cl.
*G06F 12/00* (2006.01)
(52) U.S. Cl. .................... 711/170; 711/6; 711/112; 711/114; 711/162; 711/203; 707/639; 707/646; 707/831
(58) Field of Classification Search .............. 711/170, 711/6, 112, 114, 162, 203; 707/639, 646, 707/831
See application file for complete search history.

(56) References Cited

U.S. PATENT DOCUMENTS

| 5,089,958 | A | 2/1992 | Horton et al. |
|---|---|---|---|
| 5,210,866 | A * | 5/1993 | Milligan et al. ............ 714/6 |
| 5,410,667 | A | 4/1995 | Belsan et al. |
| 6,038,639 | A | 3/2000 | O'Brian et al. |
| 6,061,770 | A | 5/2000 | Franklin |
| 6,182,198 | B1 | 1/2001 | Hubis et al. |
| 6,199,178 | B1 * | 3/2001 | Schneider et al. ............ 714/21 |
| 6,269,431 | B1 | 7/2001 | Dunham |
| 6,289,356 | B1 | 9/2001 | Hitz et al. |
| 6,311,193 | B1 | 10/2001 | Sekido |
| 2002/0053009 | A1 | 5/2002 | Selkirk et al. |
| 2002/0178335 | A1 | 11/2002 | Selkirk et al. |
| 2003/0182325 | A1 | 9/2003 | Manley et al. |
| 2003/0191909 | A1 | 10/2003 | Asano et al. |
| 2005/0004979 | A1 | 1/2005 | Berkowitz et al. |

* cited by examiner

*Primary Examiner*—Stephen C Elmore
(74) *Attorney, Agent, or Firm*—Kunzler Needham Massey & Thorpe

(57) ABSTRACT

An apparatus for managing incremental storage includes a storage pool management module that allocates storage volumes to a virtual volume. Also included is an incremental log corresponding to the virtual volume, which maps virtual addresses to storage addresses. The apparatus may also include a replication module that sends replicated data to the virtual volume and a policy management module that determines allocation criteria for the storage pool management module. In one embodiment, the incremental log includes a lookup table that translates read and write requests to physical addresses on storage volumes within the virtual volume. The replicated data may include incremental snapshot data corresponding to one or more primary volumes. The various embodiments of the virtual incremental storage apparatus, method, and system facilitate dynamic adjustment of the storage capacity of the virtual volume to accommodate changing amounts of storage utilization.

21 Claims, 7 Drawing Sheets

| Incremental Log | | |
|---|---|---|
| Virtual Address | Storage Address | |
| | Block Identifier | Volume Identifier |
| 0x500 | 0x100 | 0 |
| 0x520 | 0x100 | 1 |

600

| 610 | addLogicalDrive |
| 620 | removeTargetVolume |
| 630 | reserveTargetVolume |
| 640 | releaseTargetVolume |
| 650 | selectTargetVolume |

| 710 | Criteria Name |
| 720 | Source Drive |
| 730 | Target Drive |
| 740 | Start Block |
| 750 | End Block |
| 760 | Raid Level |
| 770a | Full/Partial! |
| 770b | Background |
| 770c | Block Address |

Fig. 7 ns to restore the primary volume 120 to a previous state. In addition, the incremental changes may be accessed at any time through the read module 160.

VIRTUAL INCREMENTAL STORAGE APPARATUS METHOD AND SYSTEM

CROSS-REFERENCE TO RELATED APPLICATIONS

This application is a continuation of U.S. patent application Ser. No. 10/713,445 filed on Nov. 14, 2003, now U.S. Pat. No. 7,412,583 entitled VIRTUAL INCREMENTAL STORAGE APPARATUS METHOD AND SYSTEM, and claims all rights of priority and incorporation available due to this continuation relationship.

BACKGROUND OF THE INVENTION

1. Field

The invention relates to devices, methods, and systems for storing and replicating data. Specifically, the invention relates to devices, methods, and systems for dynamically sizing a target volume.

2. The Relevant Art

Data processing systems are often required to copy large amounts of data to secondary storage or another primary data store. Historically, copying entire volumes of data required that a system suspend all tasks that may access a source or a target storage volume. Suspension of the various tasks or processes to conduct the copy operation greatly reduced the performance of such systems.

Incremental backup techniques have been developed to lessen the processing burden and any stoppage time associated with data archiving operations. Incremental backup methods are typically conducted by software that monitors or detects storage volume changes at a file level. For example, an incremental backup process running on the host system may be required to scan all of the files within the file system in order to ascertain which blocks of data on the storage subsystem have changed since the last backup. To perform an incremental backup, any files that have been modified since the last backup are copied to a storage volume during an incremental backup session.

One disadvantage of scanning file changes on the host is the processing burden associated with detecting changes. However, in one prior art file system, incremental changes are inherently tracked by the log-based internal structure of the file system. FIG. 1 is a schematic diagram illustrating a log-based storage system 100 illustrating the need for the present invention. The depicted log-based storage system 100 includes buses 102, 104, 106, and 108, a host 110, a primary volume 120, a replication module 130, an incremental log 140, a storage volume 150, a read module 160, and a baseline volume 170. The storage system 100 uses log-based incremental backup techniques to replicate data stored on the primary volume 120.

The host 110 facilitates communication among the various components of the storage system 100. The host 110 communicates with the primary volume 120, the replication module 130, and the baseline volume 170 through buses 102, 104, and 106 respectively. The host 110 requests data from and sends data to the primary volume 120 via the file system 112, which translates operating system calls to operations on the primary volume 120.

During backup operations, the host 110 may also send one or more baseline images to the baseline volume 170. For example, the host may send a baseline image of the primary volume 120, corresponding to a replicated image of the primary volume 120 at a particular point in time. Subsequently, the replication module 130 may copy incremental changes made on the primary volume 120 to the storage volume 150. Together, the incremental changes and the baseline image are used during recovery operations to restore the primary volume 120 to a previous state. In addition, the incremental changes may be accessed at any time through the read module 160.

In the depicted embodiment, replication operations conducted by the replication module 130 are facilitated by the incremental log 140, which translates read and write requests to physical addresses on the storage volume 150. The incremental log 140 generally includes a lookup table or similar data structure that facilitates translating read and write requests to physical addresses. In general, the lookup table or similar data structure is a mapping of a virtual address to a block address on the storage volume 150.

One problem with prior art storage systems, such as the prior art storage system 100, is selecting a proper storage capacity for the storage volume 150. In particular, the storage capacity required for incremental changes is highly application dependent. Selecting a capacity that is too large for the incremental changes results in wasted storage space. Selecting a capacity that is too small for the incremental changes could result in replication failure, loss of data redundancy, and vulnerability to failures. In order to maintain data redundancy under a wide variety of conditions, administrators typically err on the side of reserving too much capacity, resulting in wasted storage space that could be used for other applications.

Accordingly, what is needed is a storage volume with a dynamic capacity that prevents replication operation failure and wasted storage space. In particular, what is needed are apparatus, methods, and systems for dynamically adjusting the storage capacity of a storage volume in response to increasing or decreasing storage space requirements.

BRIEF SUMMARY OF THE INVENTION

The present invention has been developed in response to the present state of the art, and in particular, in response to the problems and needs in the art that have not yet been fully solved by currently available storage systems. Accordingly, the present invention has been developed to provide a method, apparatus, and system for dynamically adjusting the storage capacity of a storage volume.

In a first aspect of the present invention, an apparatus for managing incremental storage includes a storage pool management module that allocates storage volumes to a virtual volume and an incremental log corresponding to the virtual volume that maps virtual addresses to storage addresses. Due to the unique configuration of the storage pool management module, the storage capacity of the virtual volume can be dynamically adjusted to accommodate high or low levels of storage use.

The storage pool management module may monitor available space on the storage volumes. In one embodiment, the storage pool management module allocates an additional storage volume to a virtual volume in response to observing a reduction in available space on an initial storage volume. The storage pool management module can subsequently adjust the number of volumes assigned to the virtual volume, in response to changing storage requirements for the virtual volume.

The storage volumes of the present invention may include at least one volume corresponding to a redundant set of storage devices. Alternatively, a storage device may contain multiple storage volumes. In one embodiment, the redundant set of storage devices may be a RAID array of storage volumes, or the like. Using a RAID array of storage volumes allows for high performance reading and writing, data redundancy, and may reduce the complexity of implementing the virtual volume.

In certain embodiments that use a RAID array, the incremental log of the present invention may include a stripe map that facilitates mapping a virtual address to a storage address on the RAID array. In one particular embodiment, the storage address includes a volume identifier such as a LUN (logical unit number) and a block identifier such as an LBA (logical block identifier). The volume and block identifiers point to a physical location corresponding to data written on the storage volumes.

The incremental log of the present invention may include a lookup table. The incremental log appends a storage address mapping to the lookup table in response to a write operation. In addition, a read module can access data written to the virtual volume by sending a read request to the lookup table, which translates the request to a physical location on the storage volumes.

In the aforementioned embodiments, the incremental log of the present invention provides a simple, effective data structure for reading and writing to multiple storage volumes within a single virtual volume. In addition, the incremental log may be configured to translate read and write requests to multiple virtual volumes, where each virtual volume includes a variable number of storage volumes.

In another aspect of the present invention, a method for managing incremental storage includes allocating storage volumes to a virtual volume and appending a storage address mapping to an incremental log corresponding to the virtual volume. The method of the present invention conserves storage space by allocating storage volumes to the virtual volume on an as-needed basis.

The method may further include monitoring storage availability on the storage volumes. In response to observing reduced space on an initial storage volume, the method assigns an additional storage volume to the virtual volume. The method continues to assign storage volumes to the virtual volume in response to detecting low levels of space on the virtual volume.

In addition, in certain embodiments the method may provide incremental snapshot data of a source volume in response to a replication operation. This incremental snapshot data may be used in conjunction with a baseline image of the source volume to restore the source volume to a previous state. Using incremental snapshot data in conjunction with a baseline volume reduces storage space requirements and also reduces bandwidth requirements for replication operations.

Various elements of the present invention are combined into a system for managing incremental storage including at least one baseline volume, a pool of storage volumes, a storage pool management module configured to allocate storage volumes from the pool of storage volumes to one or more virtual volumes, and an incremental log corresponding to the virtual volumes that maps a virtual address to a storage address.

Certain embodiments of the system also include a replication module that transmits replicated data from a source volume to the virtual volume. The replicated data may include incremental snapshot data of the source volume. Furthermore, in selected embodiments the system includes a policy management module for determining allocation criteria used by the storage pool management module.

In one configuration, the policy management module provides feedback to a user in response to monitoring reduced space on the virtual volume. In another configuration, the policy management module may allow a user to customize allocation criteria that define appropriate conditions for allocating and de-allocating storage volumes. Thus, the policy management module enables a user such as a system administrator to manage the storage volumes within the virtual volume.

The present invention dynamically adjusts storage capacity on the virtual volume, preventing critical applications from having to be taken off-line to adjust storage capacity. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a text-based diagram depicting one embodiment of a snapshot pool programming interface of the present invention;

FIG. 7 is a text-based diagram depicting one embodiment of a snapshot criteria data structure of the present invention.

DETAILED DESCRIPTION OF THE INVENTION

Figure 1:
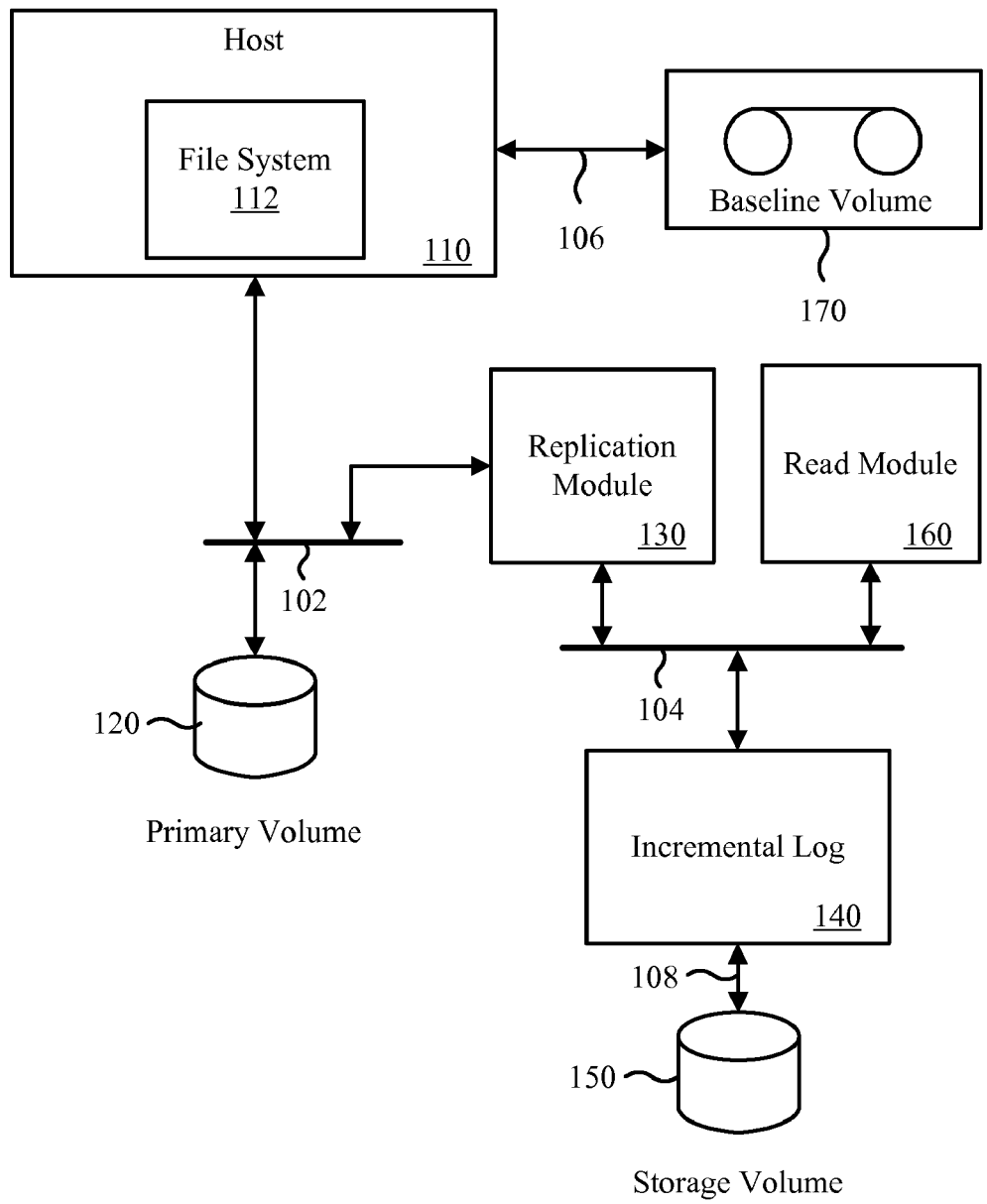
FIG. 1 is a schematic diagram illustrating a typical currently available storage system.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 2 through 5, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network, or alternatively on one or more computer readable media.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
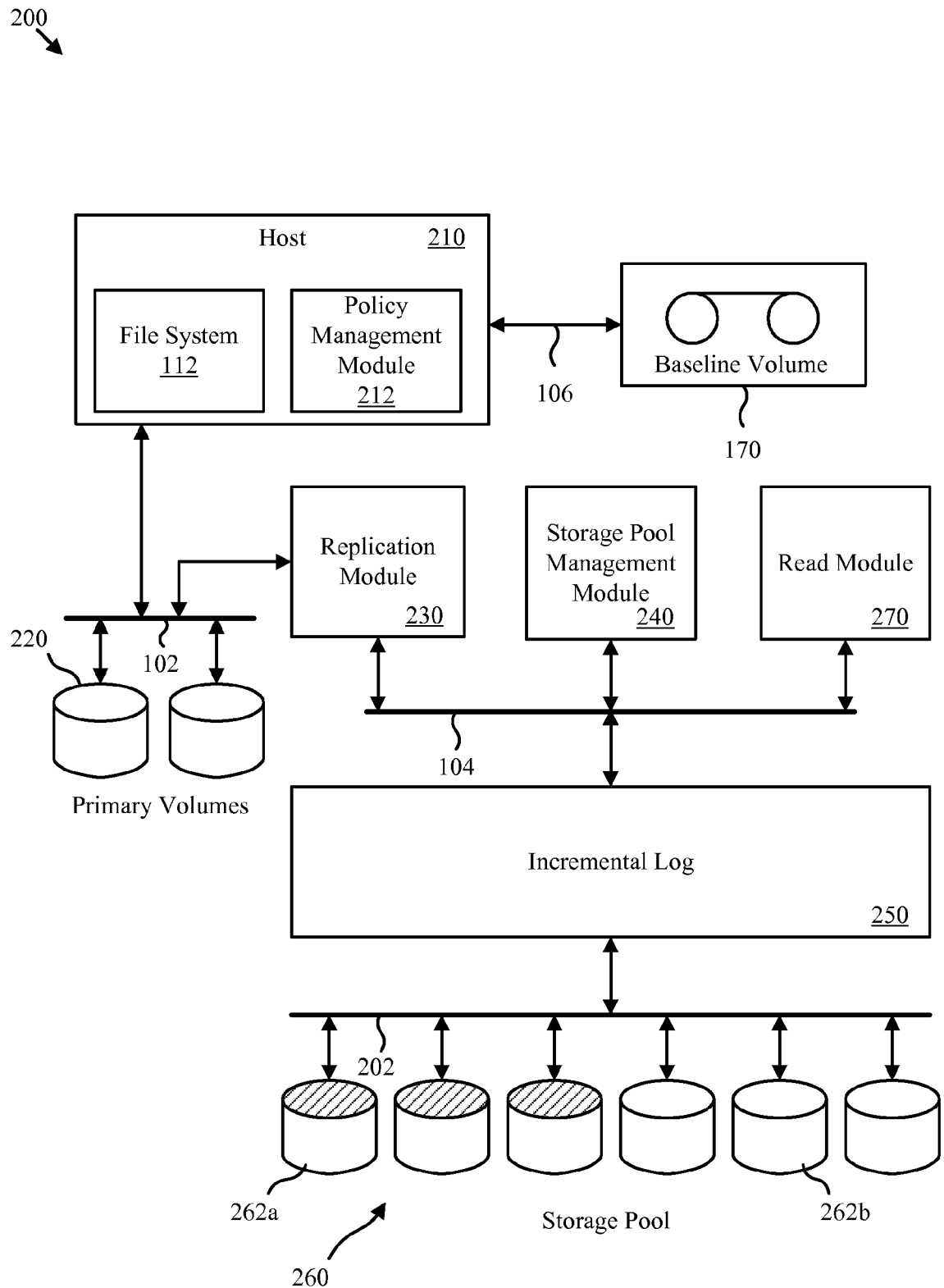
FIG. 2 is a schematic diagram illustrating a virtual incremental storage system of the present invention.

FIG. 2 is a schematic diagram illustrating a virtual incremental storage system 200 of the present invention. The depicted embodiment of the virtual incremental storage system 200 includes a bus 202, a host 210, a policy management module 212, one or more primary volumes 220, a replication module 230, a storage pool management module 240, an incremental log 250, a storage pool 260 of storage volumes 262, and a read module 270. In addition, the virtual incremental storage system 200 may include elements of the log-based storage system 100, including buses 102, 104, and 106, a file system 112, and a baseline volume 170.

One application of the virtual incremental storage system 200 is replicating data stored on the primary volumes 220 for backup storage purposes. As in the storage system 100, the baseline volume 170 receives backup data from the primary volumes 220. In addition, the storage pool 260 of the present invention may receive backup data from the primary volumes 220 via the improved replication module 230 and incremental log 250.

A significant advantage of the present invention over currently available storage systems is that the storage pool 260 may grow or shrink dynamically, according to the storage needs of the system in which it is deployed. While depicted in a secondary storage role, the storage pool 260 and associated modules may also be used for primary storage.

The host 210 is in communication with the primary volumes 220, the replication module 230, and the baseline volume 170 through buses 102 and 106, respectively. In one embodiment, the host 210 requests data from and sends data to the primary volumes 220 via the file system 112, which translates operating system calls to operations on the primary volumes 220.

Other modules may also communicate with each other through various buses. The replication module 230, the storage pool management module 240, and the read module 270 communicate with the incremental log 250 via the bus 104, and the incremental log 250 communicates with the storage pool 260 via the bus 202.

While depicted as components connected by buses to various other components of the virtual incremental storage system 200, the replication module 230, the storage pool management module 240, the read module 270, and the incremental log 250 each may reside on one or more storage controllers (not shown). Alternatively, the aforementioned modules and the incremental log 250 may reside in the storage pool 260 or on the host 210.

During one manner of backup operations of the present invention, the host 210 sends data to the baseline volume 170. The data transmitted to the baseline volume 170 may contain a baseline image of the primary volumes 220, corresponding to a replicated image of the primary volumes 220 at a particular point in time. In one application, the baseline image stored on the baseline volume 170 is used during recovery operations to restore the primary volumes 220 to a previous state.

In certain embodiments, the host 210 may instruct the replication module 230 to conduct replication operations. The replication module 230 responds by replicating incremental changes made to the primary volumes 220 and storing the replicated changes on the storage pool 260. Incremental changes replicated by the replication module 130 may include incremental snapshot data of the primary volumes 220.

In one embodiment, the incremental changes stored in the storage pool 260 may be accessed at any time through the read module 270. The read module 270 provides an alternate access path to data stored on the storage pool 260, for general use purposes or in case of failure of the primary volumes 220.

In response to failure of the primary volumes 220, the host 210 may initiate recovery operations. During one embodiment of recovery operations, the incremental changes stored in the storage pool 260 are combined with the baseline image stored on the baseline volume 170 to restore the primary volumes 220 to a desired state. In one embodiment, the incremental changes are incremental snapshot data that are combined with the baseline image data to reconstruct the primary volumes 220.

Replication operations conducted by the replication module 230 are facilitated by the incremental log 250, which translates read and write requests to physical addresses in the storage pool 260. In one embodiment, the incremental log 250 includes a lookup table or other similar data structure that facilitates translating read and write requests to physical addresses on the storage volumes 262 within the storage pool 260.

The storage pool 260 includes a set of storage volumes 262. In one configuration, the storage pool management module 240 adds one or more unassigned storage volumes 262b to a virtual volume (not shown) in response to observing reduced storage space on the virtual volume. Storage volumes 262 that have been assigned to the virtual volume are illustrated with a shaded surface as allocated storage volumes 262a in FIG. 2.

The storage pool management module 240 may remove one or more allocated storage volumes 262a from the virtual volume in response to observing surplus storage space on the virtual volume. The removed storage volumes 262 become unassigned storage volumes 262b, which may be allocated to a second virtual volume. The replication module 230 may replicate data stored on a multiple primary volumes 220 and store the replicated data on corresponding virtual volumes. Thus, data may be replicated from multiple primary volumes 220 to multiple virtual volumes, where each virtual volume includes one or more allocated storage volume 262a.

In certain embodiments, the storage pool management module 240 allocates storage volumes 262 to the virtual volume according to allocation criteria determined by policies such as those set by the policy management module 212. The policies may include allocation criteria that define appropriate conditions for allocating storage volumes 262 to the virtual volume. In one embodiment, appropriate conditions include a percentage of storage space utilization of the allocated storage volumes 262a, such as 95% storage space utilization, or the like.

As an example of using allocation criteria, the storage pool management module 240 may detect high storage space utilization on initially allocated storage volumes 262a, and in response allocate a new storage volume 262 to the virtual volume. Although the new storage volume 262 is allocated to the virtual volume, data may continue to be written to the initially allocated storage volumes 262a until storage space on the initially allocated storage volumes 262a is completely utilized. In the aforementioned scenario, in response to the initially allocated storage volumes 262a reaching 100% storage space utilization, data writing commences on the new storage volume 262.

Through policies such as those supported by the policy management module 212, a user may determine allocation criteria and instruct the storage pool management module 240 to automatically allocate storage volumes 262 to the virtual volume in response to allocation criteria fulfillment. Alternatively, the user may use policies to instruct the storage pool management module 240 to prompt the user in response to allocation criteria fulfillment.

One example of prompting a user includes informing the user that allocation criteria have been fulfilled and requesting the user to take action. The user may take action by instructing the storage pool management module 240 to allocate an unassigned storage volume 262b to the virtual volume. Alternatively, the user may take action by terminating replication operations. In addition, the user may use the storage pool management module 240 to create additional virtual volumes and manage the virtual volumes.

One configuration of the present invention allows data from multiple primary volumes 220 to be replicated onto one virtual volume. For instance, the replication module 230 may replicate data from a first primary volume 220, utilizing up to 40% of the virtual volume. The replication module 230 may also replicate data from a second primary volume 220, utilizing up to 60% of the virtual volume. As the allocated storage volumes 262a in the virtual volume reach a storage space utilization determined by the allocation criteria, the storage pool management module 240 allocates additional storage volumes 262 to the virtual volume.

The depicted virtual incremental storage system 200 provides greater storage flexibility than currently available storage systems. The increased flexibility is due in part to the unique nature of the storage pool management module 240, which allocates storage volumes 262 to the virtual volume as required. As a result of this flexibility, a highly efficient use of storage volumes 262 conserves storage space and prevents potential replication failures.

Figure 3:
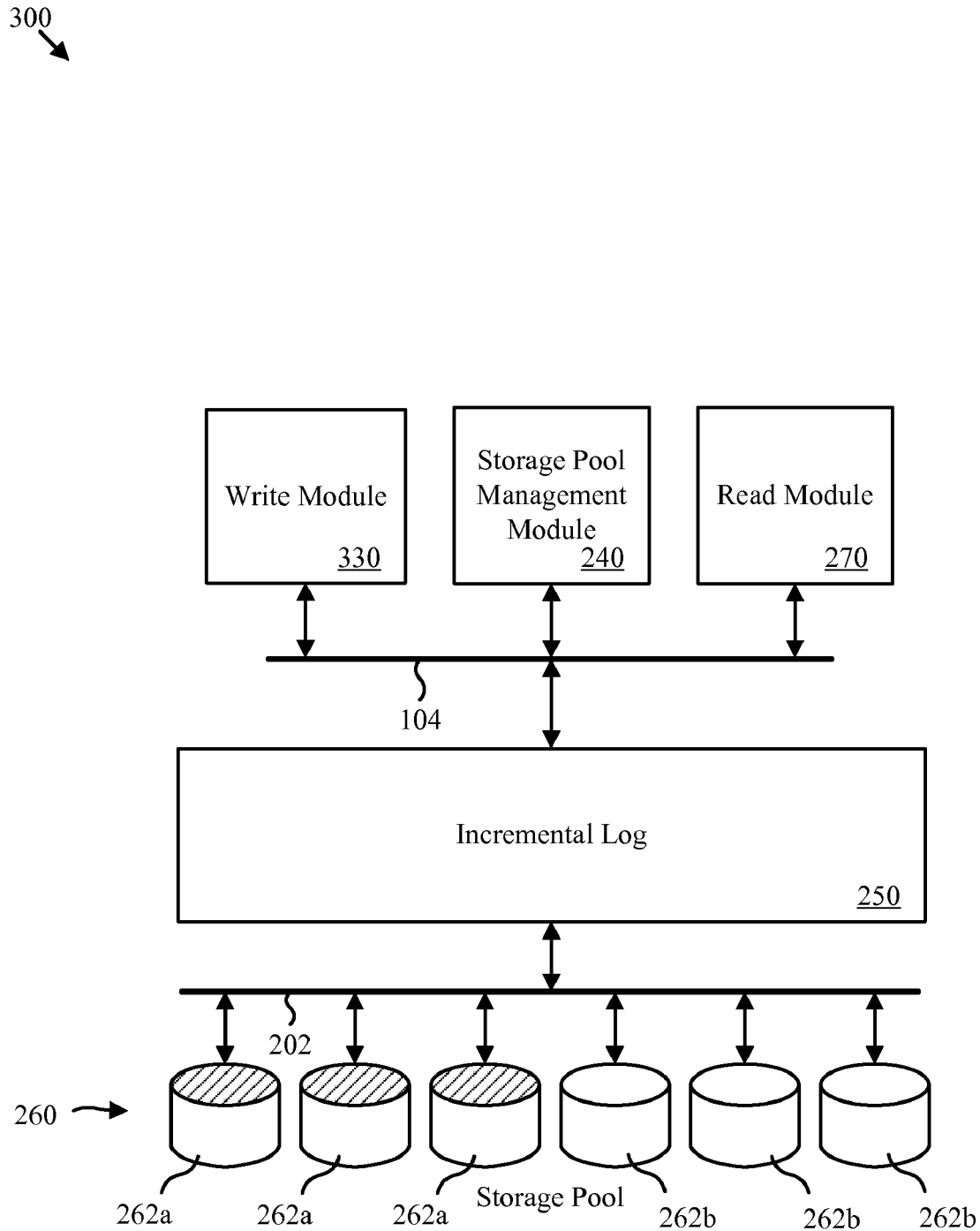
FIG. 3 is a schematic diagram illustrating one embodiment of a virtual incremental storage apparatus of the present invention.

FIG. 3 is a schematic diagram illustrating one embodiment of a virtual incremental storage apparatus 300 of the present invention. The depicted embodiment of the virtual incremental storage apparatus 300 includes a bus 104, a bus 202, a write module 330, a storage pool management module 240, an incremental log 250, a storage pool 260, allocated storage volumes 262a, unassigned storage volumes 262b, and a read module 270.

The write module 330, the storage pool management module 240, and the read module 270 communicate with the incremental log 250 via the bus 104, and the incremental log 250 communicates with the storage pool 260 via the bus 202. The incremental log 250 translates read and write requests from the write module 330 and the read module 240 to physical addresses used to access the storage pool 260. In one embodiment, the write module 330 is the replication module 230 and is configured to support replication operations in addition to standard write operations.

In one embodiment, the incremental log 250 resides on the storage volumes 262 stored within the storage pool 260. Changes made to a source volume may be generated and appended to the incremental log 250 by the write module 330. In another embodiment, the incremental log 250 is a lookup table that maps the changes replicated from the source volume to physical blocks on the storage volumes 262.

In certain embodiments, the lookup table or similar data structure maps a virtual address to a block address in the storage pool 260. In one embodiment, the storage address includes a volume identifier and also a block identifier, which may be a logical block identifier. The volume identifier indicates which storage volume 262 contains the data mapped to by the virtual address, and the block identifier indicates where the data resides on the storage volume 262.

The read module 270 retrieves data stored within the storage pool 260. The read module 270 may retrieve data in response to failure of a source storage volume, or the read module 270 may retrieve data for general use by an application. In addition, the read module 270 may retrieve data from the storage volumes 262 in order to send the data to a backup device, such as a tape system or the like.

The storage pool management module 240 may selectively allocate storage volumes 262 to the virtual volume. In one embodiment, the storage pool management module 240 allocates storage volumes 262 to the virtual volume in response to observing reduced space on the virtual volume. Additionally, the storage pool management module 240 may also remove storage volumes 262 from the virtual volume in response to observing a surplus of storage space on the virtual volume.

In one embodiment, the removed storage volumes 262 become unassigned storage volumes 262b. The storage pool management module 240 may allocate one or more of the unassigned storage volumes 262b to other virtual volumes. Consequently, different storage volumes 262 from the storage pool 260 may be allocated to separate virtual volumes.

The storage pool 260 of the present invention may be a RAID array of a storage device corresponding to the storage volumes 262. In one embodiment utilizing a RAID array, the incremental log 250 maintains a stripe map that facilitates translating read and write requests to physical data blocks on the storage volumes 262. Using a RAID array for the storage pool 260 allows for high performance reading and writing, large storage capacities, data redundancy, error correcting capability, and ease of implementation.

The virtual incremental storage apparatus 300 of the present invention minimizes waste of storage space. In addition, the virtual incremental storage apparatus 300 provides a dynamically sizable storage pool 260 for receiving replicated data, such as incremental snapshot data of the primary volumes 220 and the like.

Figure 4:
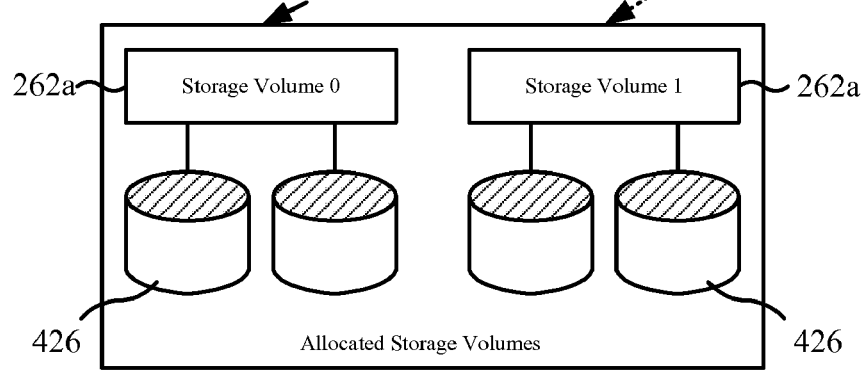
FIG. 4 is a block diagram illustrating one embodiment of an incremental log and associated storage volumes of the present invention.

FIG. 4 is a block diagram illustrating one embodiment of an incremental log and associated storage volumes 400 of the present invention. The depicted embodiment of the incremental log and associated storage volumes 400 includes a set of allocated storage volumes 262a, a lookup table 410, a virtual address 412, a storage address 414, a block identifier 416, a volume identifier 418, and one or more storage devices 426.

In the depicted embodiment, the incremental log 250 includes a lookup table 410. The lookup table 410 may be stored in RAM (random access memory), or alternatively, the lookup table may be stored in the storage pool 260. In one embodiment, the lookup table 410 is part of a stripe map, and the storage pool 260 constitutes a RAID array of storage devices.

One form of the lookup table 410 contains entries corresponding to virtual addresses 412 and storage addresses 414. Individual storage addresses 414 may correspond to individual virtual addresses 412. The correspondence between storage addresses 414 and virtual addresses 412 constitutes a mapping of virtual addresses 412 to physical data blocks stored at the storage addresses 414.

In the depicted embodiment, each storage address 414 includes a block identifier 416 and a volume identifier 418. The volume identifier 418 indicates which allocated storage volume 262a contains data pointed to by the virtual address 412, and the block identifier 416 indicates which logical block on a storage device 426 within the allocated storage volume 262a contains the data. In the RAID array embodiment, where the storage pool 260 constitutes a RAID array, the volume identifier 418 may be a logical unit number (LUN) or virtual logical unit number (VLUN).

In the depicted Figure, a few examples of mappings are illustrated. In a first example, a virtual address 412 with value 0x500 maps to a volume identifier 418 with value 0 and block identifier 416 with value 0x100. The volume identifier 418 with value 0 points to an allocated storage volume 262a also having value 0. In addition, the block identifier 416 with value 0x100 points to a physical address of 0x100 on a particular storage device 426 within the storage volume 262a that has a value of 0.

In another example of a mapping, a virtual address with value 0x510 maps to a volume identifier 418 with value 1 and block identifier with value 0x100. The volume identifier 418 with value 1 points to an allocated storage volume 262a also having value 1, and the block identifier 416 with value 0x100 points to a physical address of 0x100 on a particular storage device 426 within the storage volume 262a that has a value of 1.

In each aforementioned example, the block identifier 416 had a value of 0x100; however, each block identifier 416 pointed to different data on different allocated storage volumes 262a due to the to different storage volumes 262a referenced by the volume identifiers 418. These examples illustrate the low complexity of the incremental log and associate storage volumes 400, which enables low-complexity read and write operations to different storage volumes 262 within the storage pool 260.

Figure 5:
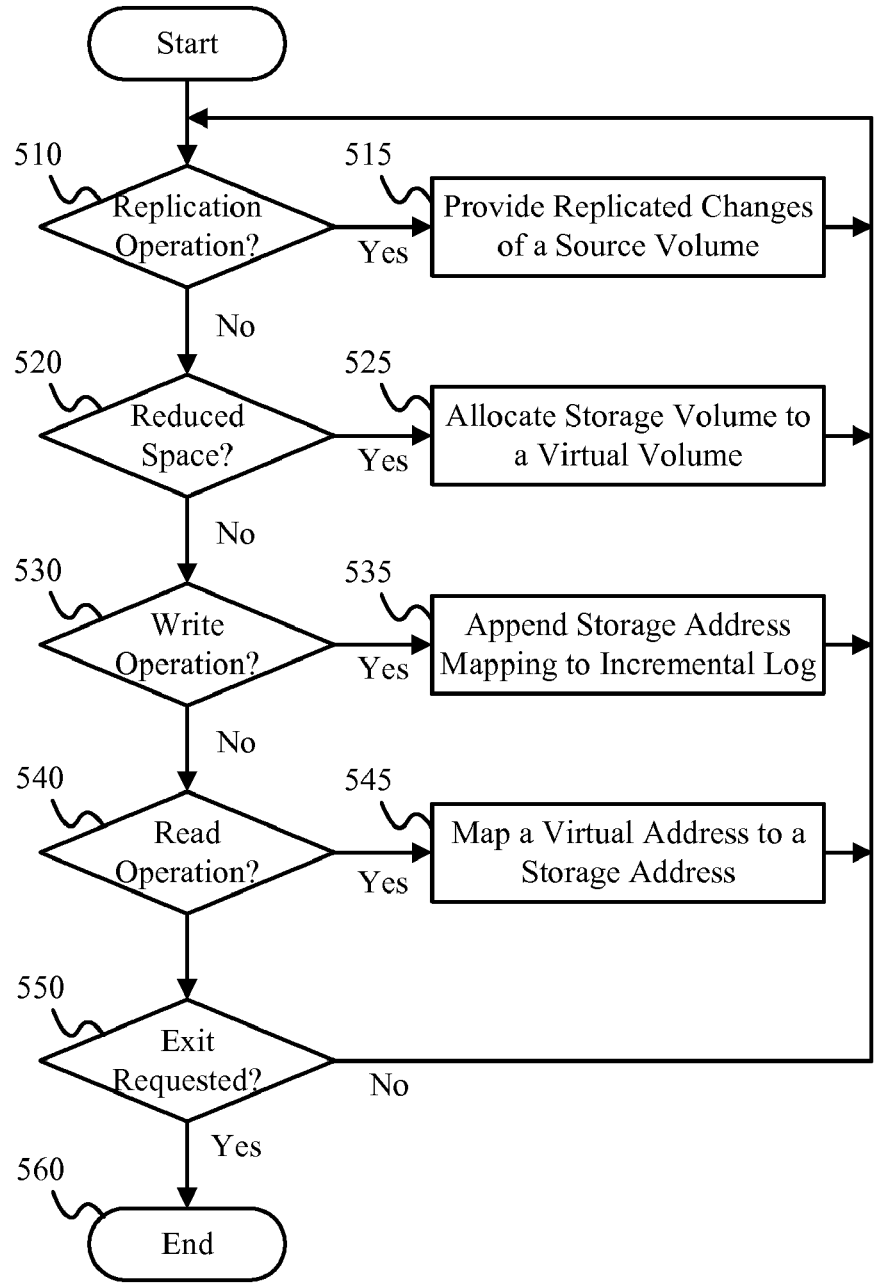
FIG. 5 is a flow chart diagram illustrating one embodiment of a virtual incremental storage method of the present invention.

FIG. 5 is a flow chart diagram illustrating one embodiment of a virtual incremental storage method 500 of the present invention. The depicted embodiment of the virtual incremental storage method 500 includes a replication operation test 510, a replicate changes step 515, a reduced space test 520, an allocate storage volume step 525, a write operation test 530, an append storage mapping step 535, a read operation test 540, a map virtual address step 545, and an exit requested test 550. The virtual incremental storage method 500 may be used to reduce storage waste in an incremental storage subsystem such as the storage pool 260 depicted in FIGS. 2 and 3.

The depicted embodiment of the virtual incremental storage method 500 begins with the replication operation test 510. The replication operation test 510 determines whether replication operations on a source volume such as a primary volume 220 have been initiated. In response to determining that replication operations have been initiated, the method proceeds to the replicate changes step 515.

In one embodiment of the replicate changes step 515, a module such as the replication module 230 replicates data from a source volume such as the primary volume 220 and sends the replicated data to the storage pool 260. Replication operations may include snapshot operations, or the like. After providing replicated changes of the source volume 515, the method loops back to the beginning of the virtual incremental storage method 500.

The reduced space test 520 determines whether additional storage volumes 260 need to be allocated to the virtual volume. In one embodiment, a module such as the storage pool management module 240 determines whether additional storage volumes 260 need to be allocated to the virtual volume. In response to the reduced space test 520 determining that additional storage devices are required, the method proceeds to the allocate storage volume step 525.

The allocate storage volume step 525 provides additional storage space by adding a storage volume to the virtual volume. In one embodiment, the storage volumes 262 are allocated to the virtual volume by the storage pool management module 240. The method continues by looping back to the beginning of the virtual incremental storage method 500.

The write operation test 530 determines whether a write operation has been initiated. In response to the write operation test 530 determining that a write operation has been initiated, the method proceeds to the append storage mapping step 535. In one embodiment, the append storage mapping step 535 includes appending a storage address 414 comprising a volume identifier 418 and block identifier 416 to a lookup table 410, a stripe map, or a similar data structure. The storage address 414 points to physical data stored on the storage volumes 262. In response to completion of the append storage mapping step 535, the method continues by looping back to the beginning of the virtual incremental storage method 500.

The read operation test 540 determines whether a read operation has been initiated. In one embodiment, the read module 270 performs read operations on the storage volumes 262. In another embodiment, the storage pool management module 240 performs read operations on the storage volumes 262 to determine storage capacity utilization on the storage volumes 262.

In response to determining that a read operation has been initiated the method proceeds to the map virtual address step 545. As one example of the map virtual address step 545, the read module 270 sends requests to the incremental log 250, which translates the requests into physical addresses on the storage volume. By translating the requests into physical addresses, the incremental log 250 enables the read module 270 to retrieve data stored at the physical addresses.

The exit requested test 550 determines whether a request to exit the method 500 has been issued for example by control process associated with a storage subsystem. If a request has been issued the method 500 terminates 560. If no request has been issued the method continues by looping back to the beginning of the virtual incremental storage method 500.

The virtual incremental storage method 500 of the present invention may be used to continuously monitor storage volumes such as the storage volumes 262 to determine whether additional space is required on a virtual volume. By continuously monitoring the storage volumes and dynamically allocating unassigned storage volumes to the virtual volume as needed, the virtual incremental storage method 500 of the present invention improves storage capacity utilization over currently available methods.

In certain embodiments of the present invention the storage pool management module 240 may provide one or more programming interfaces to facilitate management of the storage pool 260. For example, in one embodiment, a user creates system volumes (logical volumes) of any size and RAID level and adds them to the storage pool 260. Additional state information may be added to standard state information associated with logical drives to facilitate managing the volumes within the storage pool 260.

Referring to FIG. 6, a snapshot pool programming interface 600 includes an addLogicalDrive function 610, a removeTargetVolume function 620, a reserveTargetVolume function 630, a releaseTargetVolume function 640, and a selectTargetVolume function 650. The snapshot pool programming interface 600 facilitates managing snapshot resources and simplifies programming complexity.

The addLogicalDrive function 610 adds a logical drive to the storage pool 260. In certain embodiments, adding the logical drive to the storage pool prevents access to the drive by a host unless the drive has been reserved and used in a snapshot relationship. In one embodiment, any storage subsystem state information associated with the logical drive must have been previously initialized in the storage subsystem for snapshot target pool use.

Referring to FIG. 7, a snapshot criteria data structure 700 includes a criteria name 710, a source drive 720, a target drive 730, a start block 740, an end block 750, a raid level 760, and a set of snapshot flags 770. The snapshot criteria data structure 700 may be used to simplify selection of target volumes from a storage pool.

The criteria name 710 specifies a name for the criteria defined in the snapshot criteria data structure 700. In one embodiment, a source logical drive number and name are concatenated in order to uniquely identify snapshot criteria. The source drive 720 identifies the logical drive to be used as a source for snapshot operations. In one embodiment, the source drive is identified using a logical drive number. Similarly, the target drive 730 identifies the logical drive to be used as a target for snapshot operations. In one embodiment, the target drive 730 may be specified as a null identifier indicating that a particular is not required. A null identifier may be overwritten upon selection of an actual target volume.

The start block 740 and the end block 750 facilitate optional specification of a starting and ending logical block address (LBA) on the source volume for a snapshot operation. The raid level 760 indicates acceptable RAID levels for the snapshot target. In one embodiment, the raid level 760 is a bit field with each bit representing a distinct RAID level.

The snapshot flags 770 specify options for the snapshot operation. For example, the Full/Partial! flag 770a indicates whether a full snapshot or partial (i.e. incremental) is to be conducted. The background flag 770b indicates whether the snapshot is to be conducted in the background. The block address flag 770c indicates whether the snapshot is to be limited to the blocks specified by the start block 740 and the end block 750.

The snapshot criteria data structure 700 may be used to specify the information necessary to select a snapshot target drive from the snapshot pool when necessary. In certain embodiments, a single system drive may have more than one snapshot criteria defined. In this manner, different criteria can be used for a backup volume than for a test volume. In one embodiment, default criteria may be assigned to a system drive. The use of default criteria facilitates using a particular source drive without specific knowledge of the drive attributes.

By using the snapshot criteria concept, the criteria used for a snapshot operation may be specified prior to establishing a snapshot pool. Also, the snapshot targets need not be explicitly defined by an application requesting snapshot services. In one embodiment, the snapshot criteria for a given operation are created and stored on a RAID controller along with other configuration data associated with storage devices. Storing the snapshot criteria on a RAID controller facilitates accessing snapshot criteria multiple hosts.

Figure 8:
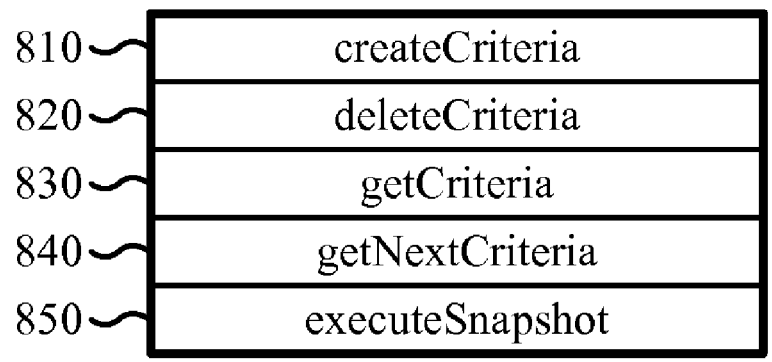
FIG. 8 is a text-based diagram depicting one embodiment of a snapshot criteria programming interface of the present invention.

Referring to FIG. 8, a snapshot criteria programming interface 800 includes a createCriteria function 810, a deleteCriteria function 820, a getCriteria function 830, a getNextCriteria function 840, and an executeSnapshot function 850. The snapshot criteria programming interface 800 simplifies specifying and executing snapshot operations.

The createCriteria function 810 creates new snapshot criteria for a (source) system drive or volume. In one embodiment, a unique name is specified for the criteria and the criteria conforms to the criteria data structure shown in FIG. 7. The deleteCriteria function 820 deletes criteria associated with a system drive or volume. The getCriteria function 830 returns the snapshot criteria associated with a specified criteria name for a specified system drive. The getNextCriteria function 840 may be used to sequence through all criteria defined for a specified system drive or volume.

The executeSnapshot function 850 executes a snapshot operation conforming to the criteria associated with a specified criteria name associated with a system drive. In one embodiment, the executeSnapshot function 850 allocates a snapshot target from the snapshot pool 260, establishes the appropriate snapshot relationship between source and target devices, flushes the operating system files associated with system drive, initiates the snapshot operation, and reattaches the source device to the host system.

The present invention greatly simplifies data backup and other data replication operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for managing incremental storage, the apparatus comprising:

a policy management module that sets a storage management policy for storage capacity of an existing incremental backup virtual volume, wherein the existing incremental backup virtual volume stores incremental storage data from an incremental storage operation of a primary volume and the existing incremental backup virtual volume comprises at least one storage volume of a storage pool;

a storage pool management module that monitors available storage capacity of the existing incremental backup virtual volume and to change the storage capacity of the existing incremental backup virtual volume in response to the storage management policy and the available storage capacity, wherein changing the storage capacity comprises dynamically allocating and de-allocating a storage volume of the storage pool to the existing incremental backup virtual volume in response to the change to the storage capacity; and an incremental log corresponding to the existing incremental backup virtual volume, wherein the incremental log maps a virtual address of the existing incremental backup virtual volume assigned to the incremental storage data to a physical storage address of the at least one storage volume of the storage pool wherein the policy management module and the storage module comprise at least one of logic hardware elements and executable code, the executable code stored on one or more computer readable media.

2. The apparatus of claim 1, wherein the physical storage address comprises a volume identifier.

3. The apparatus of claim 1, wherein the storage pool management module further allocates and de-allocates a portion of a storage volume to the existing incremental backup virtual volume.

4. The apparatus of claim 1, further comprising a read module that reads data stored in the existing incremental backup virtual volume by way of a data path independent from a data path used to store the incremental storage data.

5. The apparatus of claim 1, wherein the storage pool management module allocates and de-allocates storage volumes without user input.

6. The apparatus of claim 1, wherein the storage pool management module further allocates a second storage volume to the existing incremental backup virtual volume in response to a reduction in available space on a first storage volume.

7. The apparatus of claim 1, wherein the storage pool comprises at least one storage volume corresponding to a redundant set of storage devices.

8. The apparatus of claim 7, wherein the redundant set of storage devices comprises a RAID (Redundant Array of Independent Disks) storage array.

9. The apparatus of claim 1, wherein the incremental log comprises a lookup table.

10. The apparatus of claim 1, wherein the storage pool management module further increases the storage capacity in response to the available storage capacity increasing above a first storage capacity threshold and to decrease the storage capacity in response to the available storage capacity decreasing below a second storage capacity threshold.

11. The apparatus of claim 10, wherein the storage pool management module further de-allocates storage volumes wherein the de-allocated storage volumes are available for allocation to a virtual volume unrelated to the existing incremental backup virtual volume.

12. A system for managing incremental storage, the system comprising:

a primary volume;

a baseline volume that stores a baseline backup copy of data on the primary volume;

a storage pool with at least one storage volume that stores incremental storage data from an incremental storage operation of the primary volume in response to changes in data stored on the primary volume after storing the baseline backup copy on the baseline volume, wherein the storage volume is allocated as an existing incremental backup virtual volume;

a policy management module that sets a storage management policy for available storage capacity of the existing incremental backup virtual volume;

a storage pool management module that monitors available storage capacity of the existing incremental backup virtual volume and changes the storage capacity of the existing incremental backup virtual volume in response to the storage management policy and the available storage capacity, wherein changing the storage capacity comprises dynamically allocating and de-allocating a storage volume of the storage pool to the existing incremental backup virtual volume in response to the change to the storage capacity; and an incremental log corresponding to the existing incremental backup virtual volume, wherein the incremental log maps a virtual address of the existing incremental backup virtual volume assigned to the incremental storage data to a physical storage address of the at least one storage volume of the storage pool.

13. The system of claim 12, further comprising a replication module that transmits the incremental data from the primary volume to the existing incremental backup virtual volume.

14. The system of claim 13, wherein the incremental data comprises incremental snapshot data of the primary volume.

15. The system of claim 12, wherein the primary volume comprises a plurality of primary volumes;

the existing incremental backup virtual volume comprises an existing incremental backup virtual volume corresponding to each primary volume, each existing incremental backup virtual volume comprising at least one storage volume of the storage pool;

the incremental log comprises an incremental log corresponding to each existing incremental backup virtual volume; and the storage pool management module monitors available capacity of each existing incremental backup virtual volume and allocates and de-allocates storage volumes for each existing incremental backup virtual volume from the storage pool.

16. The system of claim 12, wherein the storage module further allocates and de-allocates a portion of a storage volume to the existing incremental backup virtual volume.

17. The system of claim 12, wherein the baseline volume is part of the storage pool.

18. The system of claim 12, wherein the policy management module resides in a host.

19. A computer readable storage medium comprising computer readable program code for managing incremental storage, wherein the program code:

monitors available storage capacity of an existing incremental backup virtual volume;

changes a storage capacity of the existing incremental backup virtual volume in response to a storage management policy and the available storage capacity, wherein the existing incremental backup virtual volume stores incremental storage data from an incremental storage operation of a primary volume and the existing incremental backup virtual volume comprises at least one storage volume of a storage pool, the at least one storage volume allocated to the existing incremental backup virtual volume;

dynamically allocates and de-allocates a storage volume of the storage pool to the existing incremental backup virtual volume in response to a change to the storage capacity of the existing incremental backup virtual volume; and maps in an incremental log corresponding to the existing incremental backup virtual volume a virtual address of the existing incremental backup virtual volume assigned to the incremental storage data to a physical storage address of the at least one storage volume of the storage pool.

20. The computer readable storage medium of claim 19, wherein the program code further provides incremental snapshot data of the primary volume in response to a replication operation.

21. The computer readable storage medium of claim 19, further comprising reading data stored in the storage pool by way of a data path independent from a data path used to store incremental data.

* * * * *